No. 860,009. PATENTED JULY 16, 1907.
J. BECKER.
MACHINE FOR SHEARING AND PRESSING.
APPLICATION FILED JAN. 5, 1907.

2 SHEETS—SHEET 1.

Witnesses:
Edwin F. Frey
L. B. Bridges

Jacob Becker,
Inventor,
By Davis & Davis
Assr. Attorneys

No. 860,009. PATENTED JULY 16, 1907.
J. BECKER.
MACHINE FOR SHEARING AND PRESSING.
APPLICATION FILED JAN. 5, 1907.

2 SHEETS—SHEET 2.

UNITED STATES PATENT OFFICE.

JACOB BECKER, OF KALK, NEAR COLOGNE, GERMANY.

MACHINE FOR SHEARING AND PRESSING.

No. 860,009.        Specification of Letters Patent.        Patented July 16, 1907.

Application filed January 5, 1907. Serial No. 350,984.

*To all whom it may concern:*

Be it known that I, JACOB BECKER, residing at No. 9 Kaiserstrasse, Kalk, near Cologne, in the Kingdom of Prussia, German Empire, have invented certain new and useful Improvements in Improved Machines for Shearing and Pressing, of which the following is a specification.

In shearing and pressing machines heretofore generally employed, in which the upper tool holder serves as abutment, while the pressing or shearing is effected by the motion of the lower tool holder, the distance between the two tool holders must be so adjusted that the greatest work-piece to be operated upon can be easily introduced between them. The consequence hereof is that with work-pieces of small height a comparatively large dead space has to be passed through by the lower tool holder before coming into action, thus causing a very considerable useless expenditure of pressure water.

In particular with block shears a further disadvantage arises that the block has to be raised up off the rollers during the said motion, thus producing an oblique cut.

The present invention relates to an improved construction of shearing and pressing machines which differs from the above described construction in that liquid is admitted into the cylinders of the upper tool holder during a downward motion thereof, the supply of such liquid being cut off when the upper tool comes in contact with the workpiece, so that by this means the tool holder becomes rigidly fixed while at the same time the lower tool is raised so as to cut or press the workpiece.

On the accompanying drawings are shown two modes of construction of the improved machine.

Figure 1:
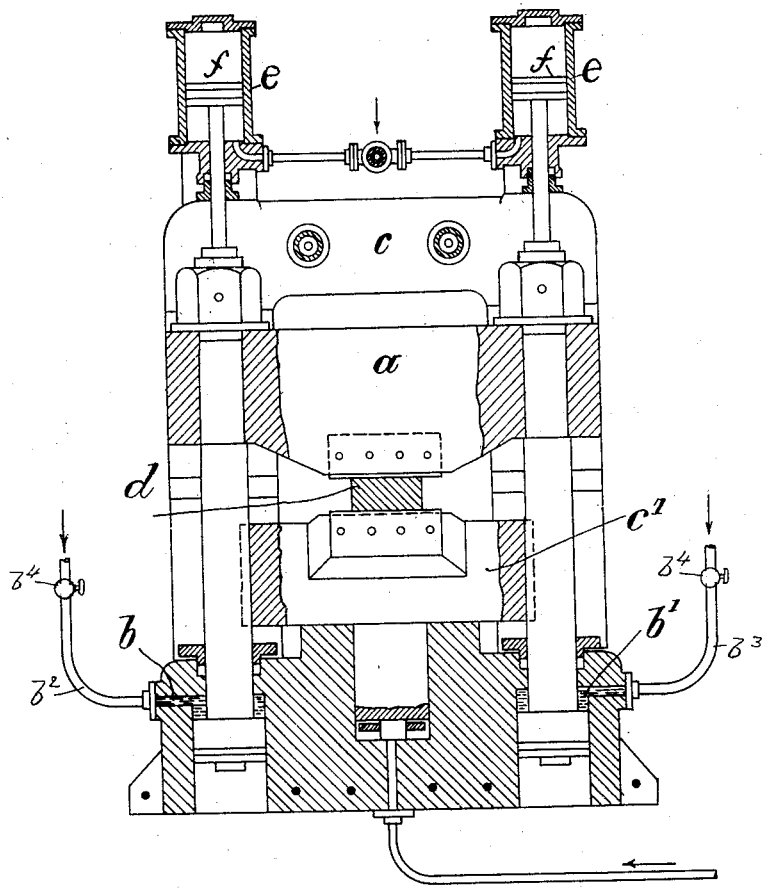
Figure 3:
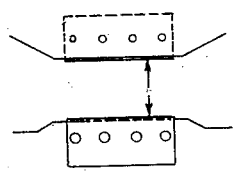
Figure 4:
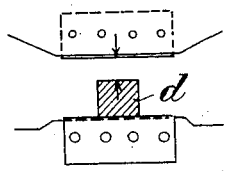
Figure 2:
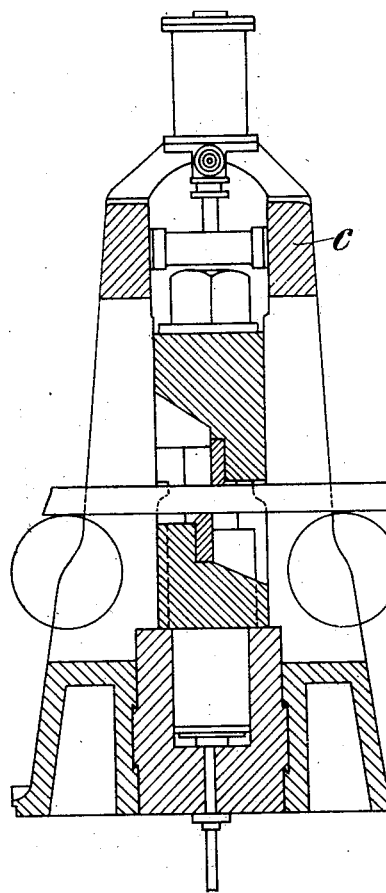
Figure 5:
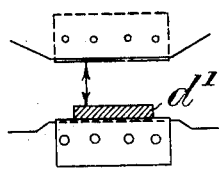
Figure 6:
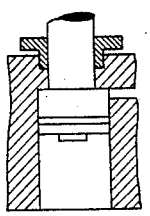

Figure 1 shows a sectional front view of one construction and Fig. 2 a cross section thereof; $a$ is the upper tool holder and $c'$ is the lower one, and $b\ b'$ are the cylinders for the upper tool holder $a$. Before operating the upper tool holder $a$ is raised into its highest position and the workpiece $d$ is then introduced; Fig. 3 shows this position without the workpiece; Fig. 4 shows the same with a larger workpiece $d$ and Fig. 5 with a smaller workpiece $d'$. Fig. 6 shows the cylinder $b$ in the position corresponding to Fig. 3.

As soon as the workpiece has been placed between the tools, the upper tool holder is allowed to sink down upon the workpiece, during which motion the cylinder spaces $b$ and $b'$ are filled with water. At the moment when the working pressure is to be exerted the supply to the cylinders $b\ b'$ is closed by valves or cocks $b^4$ so that no water can escape, whereby the upper tool holder $a$ will be held rigidly in its position upon the workpiece and thus the cutting or pressing operation can be effected without any loss of pressure water in operating the lower tool holder.

In Figs. 1 and 2, $e$ designates cylinders in which pistons $f$ work, these pistons being connected to the upper tool holder; suitable pressure fluid is employed to raise and lower the upper tool holder through the instrumentality of these pistons and cylinders.

It will be observed that the pistons which work in the cylinders $b\ b'$ are carried by rods $b^5$ depending from the upper tool-holder $a$.

Figure 7:
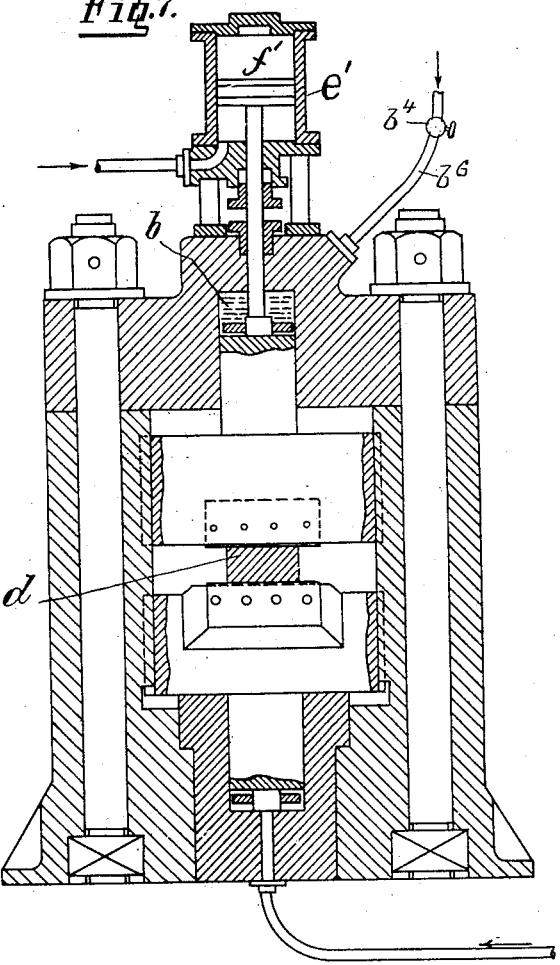

In the modification at Fig. 7 the two cylinders can be replaced by a single one arranged above the upper tool holder, or they may be arranged in any other suitable manner such as in combination with the operating hydraulic cylinders.

In the arrangement at Fig. 7, the lower tool holder being in the lowered position, the upper tool holder $a$ is lowered on to the workpiece, the space of cylinder $b$ above the plunger being at the same time filled with liquid. This space is then closed by valve or cock $b^4$ in pipe $b^6$ and the bottom tool is raised for effecting the cutting or pressing operation. This being completed the upper space of cylinder $b$ is opened to discharge and pressure fluid being admitted below the piston of the top lifting cylinder, the upper tool holder is raised while at the same time the lower tool holder sinks by gravity, its cylinder being opened to discharge. In this modification $e'$ represents the raising and lowering cylinder and $f'$ the piston working therein.

It will be observed that in this modification the cylinder $b$ is formed in the upper cross-head and that its piston rod extends up through the top of the cross-head and is connected to the piston $f'$.

Having now particularly described and ascertained the nature of my said invention and in what manner the same is to be performed, I declare that what I claim is:—

In a shearing or pressing machine, the combination of a frame, a lower tool holder and means for raising and lowering it, an upper tool holder and means for lifting and lowering it, and a supplemental abutment piston and cylinder connected to the upper tool holder, means for supplying a liquid into said supplemental cylinder above the piston as the upper tool holder is lowered, and means for confining said liquid in said cylinder during the operation of the lower tool holder, whereby said body of liquid forms an abutment and receives the upward thrust of the upper tool holder.

In testimony whereof I affix my signature in the presence of two witnesses.

JACOB BECKER.

Witnesses:
 BESSIE F. DUNLAP,
 LOUIS VANHORN.